(12) United States Patent
Bennett et al.

(10) Patent No.: US 12,500,918 B2
(45) Date of Patent: Dec. 16, 2025

(54) WEBSITE SECURITY WITH DECEPTIVE RESPONSES

(71) Applicant: Target Brands, Inc., Minneapolis, MN (US)

(72) Inventors: Steve Bennett, Minneapolis, MN (US); Timothy James Hruska, Minneapolis, MN (US); Paul Melson, Minneapolis, MN (US); Nupur Mungikar, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 254 days.

(21) Appl. No.: 18/133,289

(22) Filed: Apr. 11, 2023

(65) Prior Publication Data

US 2024/0348637 A1 Oct. 17, 2024

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1441* (2013.01)

(58) Field of Classification Search
CPC ............. H04L 63/1433; H04L 63/1425; H04L 63/1416; H04L 63/1441
See application file for complete search history.

(56) References Cited

U.S. PATENT DOCUMENTS

| | | | |
|---|---|---|---|
| 9,893,904 B2 * | 2/2018 | Roberts | H04L 12/1859 |
| 9,954,893 B1 * | 4/2018 | Zhao | H04L 63/1466 |
| 10,333,976 B1 | 6/2019 | Yudovich et al. | |
| 10,382,483 B1 | 8/2019 | Kafri et al. | |
| 10,432,665 B1 | 10/2019 | Yohai et al. | |
| 2002/0066034 A1 | 5/2002 | Schlossberg et al. | |
| 2002/0133606 A1 * | 9/2002 | Mitomo | H04L 41/28 709/229 |
| 2004/0162994 A1 | 8/2004 | Cohen et al. | |
| 2005/0076237 A1 | 4/2005 | Cohen et al. | |
| 2010/0077483 A1 * | 3/2010 | Stolfo | G06F 21/554 726/23 |
| 2014/0250524 A1 | 9/2014 | Meyers et al. | |
| 2016/0344769 A1 * | 11/2016 | Li | H04L 63/168 |
| 2016/0359882 A1 | 12/2016 | Touboul et al. | |
| 2017/0180421 A1 | 6/2017 | Shieh et al. | |
| 2017/0257385 A1 * | 9/2017 | Overson | H04L 67/565 |
| 2017/0318053 A1 | 11/2017 | Singh et al. | |
| 2018/0167412 A1 * | 6/2018 | Barrett | H04L 63/1491 |
| 2018/0302438 A1 | 10/2018 | Robertson | |
| 2020/0228538 A1 | 7/2020 | Soule et al. | |
| 2022/0394052 A1 * | 12/2022 | Grossman-Avraham | G06F 21/552 |
| 2024/0187452 A1 * | 6/2024 | Kaidi | G06F 21/6245 |

* cited by examiner

*Primary Examiner* — Vance M Little

(74) *Attorney, Agent, or Firm* — Barnes & Thornburg LLP

(57) ABSTRACT

A web server system hosts a website, the website server system being configured to receive a request for web content on the website, generate a response containing the web content, and transmit the response with the web content, receive, from a web security system, deceptive response instructions, modify, in response to receiving the deceptive response instructions, the response to contain different content from web content that has been requested, and transmit, to the client computing device, the response with the different content.

17 Claims, 8 Drawing Sheets

WEBSITE SECURITY WITH DECEPTIVE RESPONSES

TECHNICAL FIELD

This document describes systems and methods related to detecting and preempting potential website security issues through the use of deceptive website responses.

BACKGROUND

Websites, such as ecommerce websites, may ask customers to provide their personal identification information, account numbers, and other sensitive information, and may be vulnerable to security threats including hackers, spammers, identity thieves, and others looking to defraud a website (e.g., purchase goods using stolen credit cards). Websites have been developed with security measures in place, such as security logins, user authentication steps, device authentication steps, encryption, and/or others. Website security has been designed to protect a website from falling victim to bad actors seeking to defraud the website's services, and to also protect its own users/customers from being potentially harmed (e.g., preventing theft of private/sensitive user data, such as financial account information, usernames, passwords, and other sensitive information).

SUMMARY

This document is generally directed systems, methods, devices, and techniques for identifying and thwarting website security threats through the use of native deceptive responses that are generated by the web server. For example, security responses to deal with malicious website users, such as users who are attempting to use stolen login credentials and/or payment information, have involved diverting the malicious website traffic to other sites, webpages, and/or third party systems, such as providing an HTTP 404 response indicating that an error has occurred. While such responses can be effective at stopping the specific malicious traffic, they can notify the attacker that their attempts have been detected, which can prompt the attacker to try different alternate attacks that may go undetected. The disclosed technology provides an extensible platform through web servers can, themselves, provide native deceptive responses that will be indistinguishable from other native (non-deceptive) responses. Native responses can include web pages and other web content that are provided directly by the web server that is under attack instead of being diverted to other systems or servers for handling. As a result, native responses to malicious attacks can include all of the same code snippets, styles, scripts, formatting, images, and other related data that would be found when requesting content from the web server when it is not under attack-meaning not just the visual impression of the native response will be the same, but the underlying code will appear the same as well, which can make detection of a deceptive response challenging to near impossible to detect.

The disclosed technology can use deceptive responses, which can be responses that deviate or differ from the content that would normally be provided by processing a request through the web server's codebase, can be effective in restricting the attacker from their objective while also avoiding detection by the attacker. For example, if a request from a client device to login to a website is identified as a malicious and stolen login credentials are submitted that are actually valid (would permit logging in to site), the disclosed technology can flag the malicious attack and can provide a deceptive, such as providing a native page from the website with information indicating that the login attempt was unsuccessful. Any of a variety of different deceptive responses are possible.

The disclosed technology additionally is able to detect malicious attacks through any of a variety of techniques, such as through assessment of the risk posed by a guest computing device, through the state transitions that the guest has made across the site as part of the attack, and through the data formulation of the request (e.g., URL parameters, cookies). One or more of these signals can be used to quickly and effectively identify malicious attacks, which can permit for deceptive responses to be transmitted in a timely manner (i.e., avoiding delay in response that may indicate detection to an attacker).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for detecting malicious website attacks and providing native deceptive responses to website attackers. The system includes a web server system hosting a website, the website server system being configured to receive, from a client computing device, a request for web content on the website, generate, in response to the request, a response containing the web content, and transmit, to the client computing device, response with the web content. The system includes a web security system in communication with the web server system, the web security system being configured to receive the request and associated data related to the request, determine, based on the request and the associated data, a risk score for the client computing device, wherein the risk score indicates a probability that the client computing device is a malicious attacker, determine, based on the request and the associated data, a state score for the client computing device's browsing session with the web server system, wherein the state score indicates a probability that the request is malicious in nature based on a state of the request, determine, based on the request and the associated data, a data request score for the request, wherein the data request score indicates a likelihood that the request is malicious based on the content of the request, determine, based on one or more of the risk score, the state score, and the data request score, whether the request has at least threshold likelihood of being malicious, transmit, to the web server system and in response to determining that the request has at least a threshold likelihood of being malicious, deceptive response instructions. The web server system is further configured to: receive, from the web security system, the deceptive response instructions, modify, in response to receiving the deceptive response instructions, the response to contain different content from web content that has been requested, and transmit, to the client computing device, the response with the different content. Other embodiments of this aspect include corresponding computer systems, apparatus, and computer programs recorded on one or more computer storage devices, each configured to perform the actions of the methods.

Implementations may include one or more of the following features. The determination of whether the request has at least the threshold likelihood of being malicious is based on at least two of the risk score, the state score, and the data request score. The determination of whether the request has at least the threshold likelihood of being malicious is based on the risk score, the state score, and the data request score. The risk score is further determined based on analysis of factual and contextual content related to the client computing device. The state score is further determined based on a comparison of the state of the request relative to one or more state models for the website. The one or more state models include graphs of permitted state transitions within the website. The data request score is further determined based on a comparison of the content of the request to one or more data request models for the website. The data request models include permitted URL parameters and cookies for the website. The web server system and the web security system are configured to perform their respective recited operations in parallel. The risk score, the data request score, and the state score are determined in parallel by the web security system. The response with the different content may include a native response from the web server system. Implementations of the described techniques may include hardware, a method or process, or computer software on a computer-accessible medium.

The devices, system, and techniques described herein may provide one or more of the following advantages. For example, the disclosed technology can provide for more efficient and effective detection of malicious attacks by website users, which can permit for timely native deceptive responses to be provided to attackers. This can permit for attackers to be thwarted in their attacks while at the same time can avoid the attackers readily finding out that they have been detected. In another example, the disclosed technology can provide a platform through which native deceptive responses can readily be implemented on web servers and for web services without significant modification to the native codebase. This can promote efforts to more readily and effectively combat malicious website attacks.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

This document generally describes systems for identifying potential malicious website activity posed by website guests and using natively generated countermeasures by the web service to thwart, prevent, or otherwise curtail the malicious website activity. For example, malicious website users may attempt to login to a website using stolen login credentials or may attempt to purchase items in an online store using stolen gift card and/or credit card information. The disclosed technology is directed to a technical solution to these and/or other problems created by cybersecurity threats related to malicious website activity through the use of more accurate and efficient techniques to identify the potentially malicious activity. The disclosed technology can, additionally, generate and transmit deceptive responses to the malicious activity, which can prevent the initial malicious attack on the website and can additionally send misleading signals to malicious actors about the validity of their efforts and/or data. For example, when malicious activity is identified, such as a user login with stolen credentials, the disclosed technology can generate any of a variety of deceptive responses to the attacker, such as transmitting a native web page for the site indicating that the login attempt failed even though it may have actually succeeded using the stolen credentials. Other deceptive responses are also possible, as described throughout this document.

Figure 1:
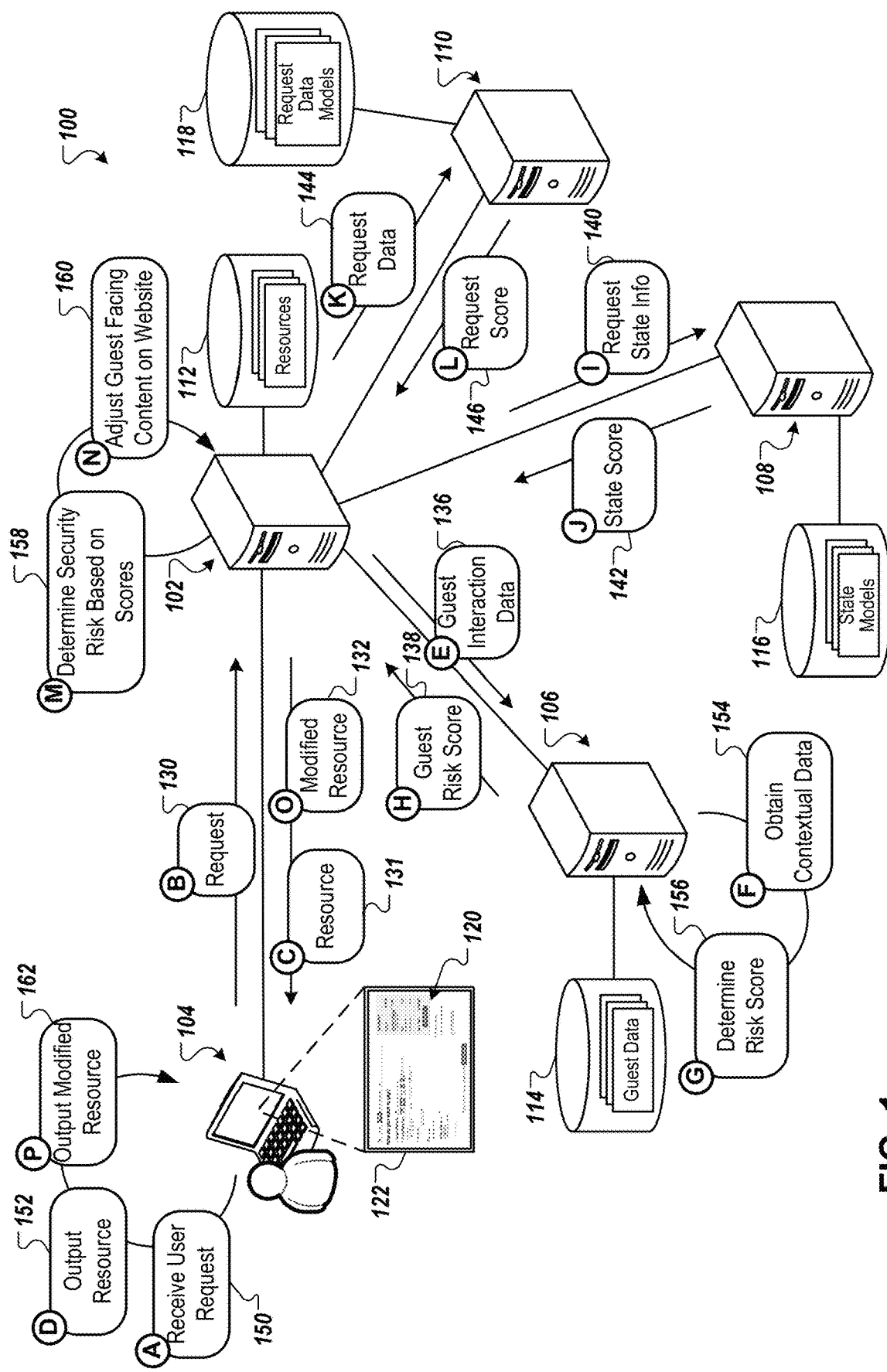
FIG. 1 is a block diagram of an example computer network environment for identifying potentially malicious activity by a guest device.

FIG. 1 is a block diagram of an example computer network environment 100 for identifying potentially malicious activity by a guest device (e.g., a digital application) accessing a website, such as an online store, and providing countermeasures (e.g., deceptive responses) natively on the website to thwart, prevent, or otherwise stop such attempts. The network environment 100 includes a web server 102 that can serve websites and other web content, a guest computing device 104 (i.e., laptop, mobile device) that can request content from the web server 102, a risk assessment system 106 that can assess the risk posed by the specific guest computing device 104, a state assessment system 108 that can assess the state of the guest computing device 104 interactions with the web server 102, and a request assessment system 110 that can analyze the data and other related information associated with the request transmitted to the web server 102.

The web server 102 hosts a website 120 including one or more webpages. The web server 102 connects to a website resources database 112 storing code (e.g., HTMP, scripts, style sheets, server-side code, client-side code, etc.) that the web server 102 executes and/or distributes to provide the website 120 (e.g., webpages thereof) on guest computing devices. The guest computing device 104 is used to access a website 120 (e.g., one or more webpages thereof) from the web server 102. The guest computing device 104 can run a browser 122 for a user to access the website 120.

The risk assessment system 106 operates to assess a security risk that a digital application being used by a guest potentially imposes on the website. The risk assessment system 106 can build an internal reputation of the digital application being used to access a website by collecting contextual information and calculating a risk score according to the contextual information. The risk assessment system 106 can aggregate a variety of facts and insights from one or more sources, and produce contextual information associated with the guest's digital application. The risk assessment system 106 can further calculate a risk score based on the contextual information. Such a risk score can represent a level of security risk from the digital application being used by the guest. As described herein, the contextual information and/or the risk score can be used to customize content on the website to provide guest experience adaptive to the level of potential security threats associated with the guest's interaction with the website. The risk assessment system 106 can access and use a guest data warehouse 116 to make risk score determinations. The guest data warehouse 116 can store historical data about guests and digital applications used by the guests with respect to the website. The guest data warehouse 116 can further store the data about the guest currently accessing or attempting to access the website. Although the risk assessment system 106 is primarily illustrated as separate from the web server 102, it is understood that the risk assessment system 106 can be part of the web server 102. The risk assessment system 106 and risk scores can be determined, for example, using the technology described in U.S. Ser. No. 17, 118, 444, which was filed on Dec. 10, 2020, is entitled WEBSITE GUEST RISK ASSESSMENT AND MITIGATION, and published as U.S. Pub. No. 2021/0185076, the entire contents of which are hereby incorporated by reference.

The state assessment system 108 receives state information for the guest computing device 104 interactions with the web server 102, such as over a web browsing session, and uses that information in combination with state models 116 for web pages and/or other content elements that are served by the web server 102 to assess possible malicious activity by the guest computing device 104. For example, while there may be a variety of process flows and navigation pathways through a website, such as selecting links that are presented in webpages to navigate between different content elements, expected and/or benign user behavior across a website may follow predictable patterns or state transitions for the website. For example, to purchase an item in an online store, a user may (a) first navigate to a page for the item to be purchased, (b) add the item to a virtual shopping cart, (c) select a checkout link, and (d) then proceed to a page to enter information to complete the purchase. The sequence of operations and interactions (a)-(d) can be considered a proper state transition for the guest computing device 104 to purchase an item on a website provided by the web server 102. Such permissible and/or expected state transitions for a website can be modeled within and represented by the state models 116. Deviations from expected state transitions contained in the state models 116 can be indicators of potential malicious activity, such as a user proceeding to state (d) proceeding to page to enter information to complete a purchase-without first transitioning from states (a)-(c) before state (d). The state assessment system 108 can generate a state score that, like the risk score generated by the risk assessment system 106, can indicate a potential likelihood that the guest computing device 104 is a malicious actor.

The request assessment system 110 can analyze the request data and other associated information with the request, such as the URL and corresponding parameters transmitted as the request, associated cookies provided with the request, and/or other information, such as network packet data and/or information. The request assessment system 110 can compare the request data and other associated information to request data models 118, which can model expected data elements and information that will be included with valid and benign requests. Requests that include data elements and/or information that deviates from the request data models 118 can be indicators of malicious activity the guest computing device 104. For example, a typical request for a particular webpage that is generated by the guest computing device 104 selecting links and/or elements that are provided by the website itself may include the following example URL "http://www.example.com/page?param1=1234&param2=xyz" and may include cookies A, B, and C that each include numerical data. The request data models 118 can model such a typical request, which may include identification of the URL ("http://www.example.com/page"), the expected parameters ("param1" and "param2"), the sequence of the expected parameters in the URL ("param1" followed by "param2"), the types of values provided by the parameters ("param1" is four digit number, "param2" is text), cookies that are presented on the guest computing device 104 (cookies A, B, and C), the type of content included in the cookies (numerical data), and/or other information. A request from the guest computing device 104 that deviates from the request model for the webpage being requested may be an indicator of potentially malicious activity by the guest computing device 104. The request assessment system 110 can generate a request score that indicate a potential likelihood of malicious intent/activity associated with the request from the guest computing device 104, similar to the risk score and the state score.

The web server 102 can operate to dynamically adjust guest facing content on the website as the guest interacts with the website based on the likelihood that the guest computing device 104 is a malicious actor, as indicated by the risk score, the state score and/or the request score. As described with regard to FIGS. 2-3, the web server 102 may include a web security system, which may alternatively be separate from and may interact with the web server 102 to dynamically adjust content. Additionally, as described below with regard to FIGS. 2-3, such as a web security system 210 may optionally include the systems 106-110, and may be configured to interface with multiple different web servers and/or web services that are offered, which can provide a variety of benefits. For instance, such a configuration-a web security system 210 being separate from and servicing multiple web services/servers-can assist with the deployment of such web security and malicious actor identification across multiple different web servers and services without each of those systems having to separately spin up and maintain instances of the web security system.

In another example, such a configuration can permit for native web content that is deceptive to be transmitted to malicious actors by the web services and servers themselves, which can avoid instances in which the deceptive responses are transmitted by other systems (different from the web server 102) and are readily detectable as being deceptive (i.e., page formatted different from native page). By using a configuration which permits for native responses to be readily generated across a wide array of web sites and services, the disclosed technology can more effectively thwart malicious website attacks by providing deceptive responses (i.e., "credit card information invalid" message when credit card information was valid, but there was a high likelihood that it was malicious act), which can cause malicious actors to give up on efforts, data, and/or information that would otherwise be effective. For instance, malicious actors may continue to use a stolen credit card across multiple different sites until the credit card fails, at which point they may discard that information and move on to using information from another stolen credit card. So not only can the disclosed technology help to thwart and stop a malicious actor with regard to its attempts with the web server 102, but its use of deceptive responses can cause malicious actors to be deterred from such attacks on other systems and/or services, which can help combat malicious website attacks.

The web server 102 can use one or more of the risk score, the state score, and the request score to determine an overall security risk that is posed by the guest computing device 104, and can modify the content (e.g., code, files, etc.) of the website according to the security risk assessment results. For example, the web server 102 can generate deceptive responses that confirm a different or opposite result from what the guest computing device 104 may be requesting, such as indicating that a login attempt was successful when the credentials were actually invalid (or vice versa), indicating that a credit card was invalid when the credit card information was actually valid (or vice versa), sandboxing the guest computing device 104 into a separate group of restricted pages and content, and/or other modified information. Although the web server 102 is primarily illustrated as a singular device, the operations related to serving content, making determinations related to potential risks, and generating deceptive responses may be bifurcated across multiple different servers and/or systems, as described with regard to FIGS. 2-3.

Referring still to FIG. 1, an overall process is described which is for assessing the risk posed by a guest visiting a website and dynamically providing a guest experience adapted to a security risk associated with the guest. The guest computing device 104 receives a user input from a guest to access and interact with a website 120 from the web server 102 (Step A, 150). The guest computing device 104 can run a browser 122 for accessing the website 120. The browser 122 can identify and retrieve resources, such as individual webpages, files, and other contents, from the web server 102 by a distinct Uniform Resource Locator (URL), and display them on the guest computing device 104.

The guest computing device 104 transmits a request (e.g., HTTP request) for a web resource (e.g., webpage, file, etc.) to the web server 102 (Step B, 130), and the web server 102 transmits a web resource to the guest computing device 104 in response to the request (Step C, 131). The guest computing device 104 outputs the web resource thereon (Step D, 152). For example, the guest computing device 104 can display a requested web page using the browser 122. In embodiments where the web server 102 provides an online shopping service, the web server 102 provides a plurality of online shopping-related webpages, such as product list pages, login page, checkout page, payment page, and other desirable webpages with which a guest can interact.

The risk assessment system 106 can receive guest interaction data (Step E, 136). The guest interaction data can be obtained by monitoring the communication between the guest computing device 104 and the web server 102. In addition, the guest interaction data can be retrieved from other computing devices or databases. The guest interaction data can include, for example, user credentials (ID), cookie-based device ID, and/or one or more browser attributes, for example.

The risk assessment system 106 can obtain contextual data from the guest interaction data (e.g., by processing the guest interaction data), some of which may be stored in a guest data repository 114 (Step F, 154). The contextual data can represent guest behavior with respect to the resources from the web server 102, operation of the digital application (e.g., the browser 122), circumstantial data relating to the guest and the digital application used by the guest to interact with the website 120 hosted by the web server 102. The contextual data can include a variety of facts and/or insights that are collected from one or more sources as described herein.

The risk assessment system 106 can determine a risk score of the guest on the website (Step G, 156). The risk score can represent a level of security threat that the guest or the digital application being used by the guest may potentially impose on the website 120. The risk score can be calculated based on the contextual data of a particular guest, the digital application being used by the guest, and/or the guest computing device being used. In addition, the risk score can also be based on the historical data about the particular guest and/or other guests of the website (including digital applications and computing devices used by the particular guest and/or other guests). The risk assessment system 106 can transmit the contextual data and/or risk score to the web server 102 (Step H, 138).

The risk assessment system 106, The state assessment 108 can receive state information related to the request from the guest computing device 104 (Step I, 140) and can analyze the state information in combination with the state models 116 to determine a state score. The risk assessment system 106 can transmit the state score to the web server 102 (Step J, 142).

Similarly, the request assessment system 110 can receive the request data and associated information (Step K, 144) and can analyze it in combination with the request data models 118 to determine a likelihood that the guest computing device 104 and its request are malicious. The analysis can result in determination of a request score, which the request assessment system 110 can transmit to the web server 102 (Step L, 146).

The score determinations by the systems 106, 108, and 110 can be performed sequentially and/or in parallel in response to receiving the request from the guest computing device 104. In some instances, fewer than all of the scores may be requested and obtained from the systems 106-110 in response to a request (i.e., only 1 score, only 2 scores), and in some instances additional scores may be conditionally obtained and/or used. The web server 102 can be configured to request a score from one of the systems 106-110 and, depending on the results that are obtained, may reach out to one or more of the other systems 106-110 for scores. For example, if the one requested score strongly indicates (i.e., score is on either end of a range of values across which scoring occurs), then additional scores from the other systems may not be obtained. However, if the requested score provides a somewhat ambiguous signal (i.e., score falls in middle of range of values), then subsequent scores may be obtained. Such staggered approaches may be used for a variety of reasons, such as for conserving and more efficiently using computing resources. Additionally, such parallel and/or staggered approaches may be selectively deployed for different web pages and sites-reserving the more processor and computing resource intensive approaches (i.e., parallel scores for all three systems 106-110) for highly sensitive pages and sites, such as pages providing financial transactions, and the less resource intensive approaches for less sensitive sites and pages.

The web server 102 can receive the risk score, the state score, and/or the request score, and can use one or more those scores to determine a likelihood that the request from the guest computing device 104 is malicious (Step M, 158). The web server 102 can use any of a variety of techniques to make such score-based determinations, such as evaluating each of the scores against a separate domain threshold (i.e., risk score threshold, state score threshold, request score threshold) to determine whether one or more of the scores indicate a likelihood that the request from the guest computing device 104 is malicious. In some instances, any one of the scores satisfying a corresponding threshold can be used as an indication of malicious intent by the guest computing device 104. In other instances, two or all of the scores satisfying their corresponding threshold may be required to arrive at a conclusion of malicious intent by the guest computing device 104. In another example, the scores may be provided along a similar numeric range (e.g., score range from 0.0-1.0, score range from 0-100), which may permit for the scores to numerically combined, such as through using the mean, median, weighted average based on confidence values (i.e., systems 106-110 may be configured to provide confidence values in association with scores), and/or other mathematical techniques. Such combined scores may be then compared against one or more combined thresholds to determine whether there is a likelihood of malicious intent from the guest computing device 104. Additionally, varying degrees of malicious activity may be determined, as well, and may result in variety deceptive responses by the web server 102. Such determinations may be based, for example, on the sensitivity of the requested content by the guest computing device 104 (i.e., financial transaction can be highly sensitive, adding item to virtual shopping cart may have lower sensitivity), and/or can be based on the strength of the malicious signal indicated by the scores. Additional and/or alternate techniques are also possible.

In response to determining that request from the guest computing device 104 is likely malicious in Step M, the web server 102 can dynamically adjust guest facing content based on the scores from the systems 106-110 (Step N, 160). Such dynamic adjustment can include, for example, providing deceptive content that modifies or otherwise alters some of the content that the server 102 would have transmitted without the risk assessment. The web server 102 can modify such guest facing content to thwart, prevent, or otherwise stop malicious activity by the guest computing device 104. For example, the web server 102 can dynamically modify the website code to change the features that are returned to the guest computing device 104, such as changing from a native webpage providing access to a user account when correct login credentials are used to a native webpage from the site indicating that the credentials were invalid. As noted above, the deceptive response may additionally be selected based on the level of risk associated with the request—with greater risk prompting selection of deceptive responses that will lock out or otherwise sandbox the guest computing device 104 from the actual website, and less risk prompting less aggressive measures. Additional and/or alternate techniques for generating deceptive responses are also possible.

When the guest facing content is modified, the web server 102 transmits a modified resource to the guest computing device 104 (Step O, 132), and the guest computing device 104 outputs the modified resource via the browser 122 (Step P, 162). The modified resource can include modified guest facing content (resources), such as deceptive content that is different from the content that would have been provided without an assessment that the guest computing device 104 is a security risk. Again, the response that is presented is a native response provided from within the web server 102 platform, as well, which can help avoid detection as deceptive by the guest computing device 104.

Figure 2:
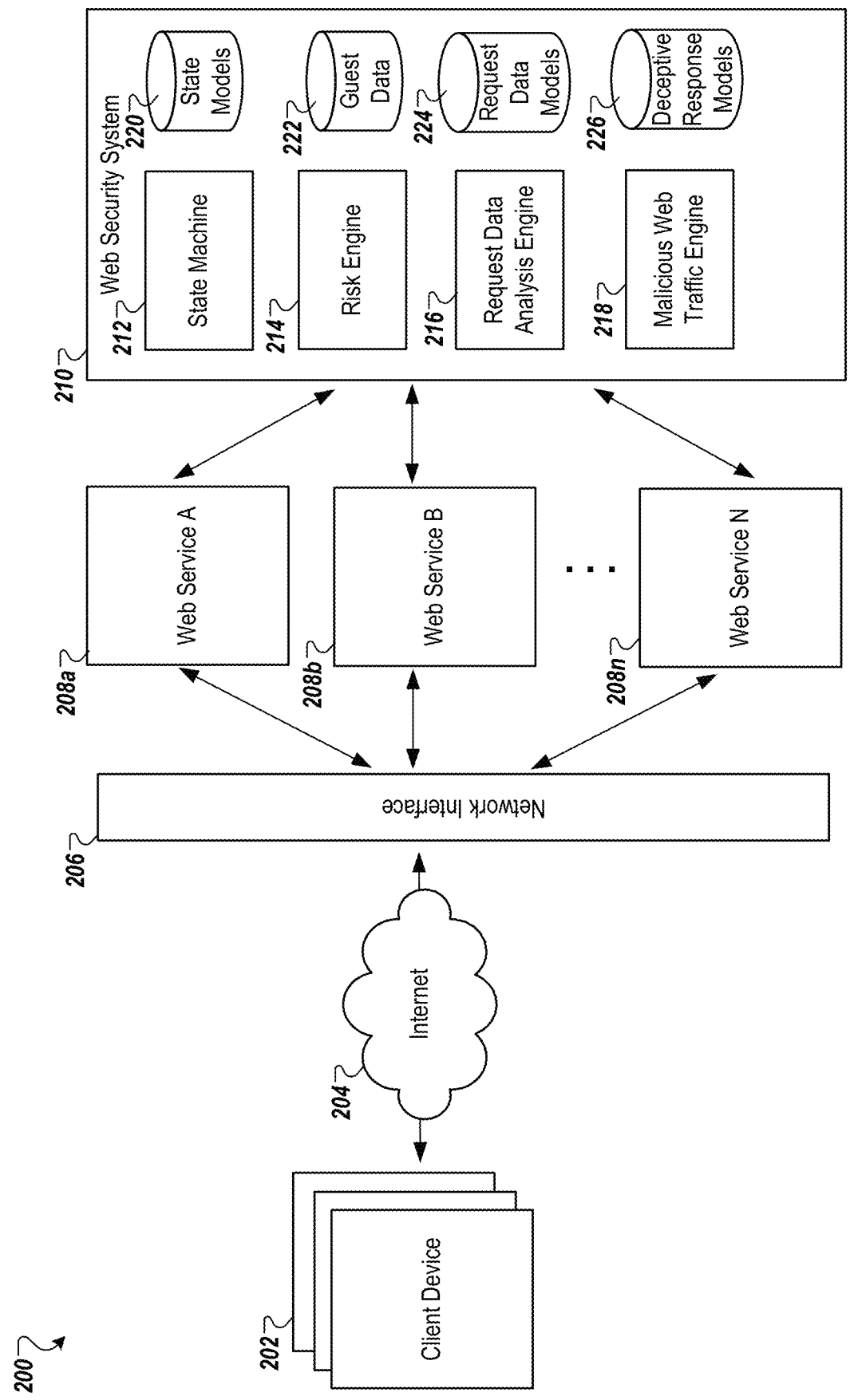
FIG. 2 is an example system for assessing the risk associated with client devices across a plurality web services.

FIG. 2 is an example system 200 for assessing the risk associated with client devices 202 across a plurality web services 208a-n. The example system 200 and its components can be similar to the platform 100 and its components, as described above with regard to FIG. 1.

The depicted system includes a web security system 210 that includes a state machine 212, a risk engine 214, a request data analysis engine 216, and a malicious web traffic engine 218. The state machine 212 can be similar to the state assessment system 108, the risk engine 214 can be similar to the risk assessment system 106, and the request data analysis engine 216 can be similar to the request assessment system 110. The malicious web traffic engine 218 can be configured to determine the risk of malicious activity based on the scores generated by the components 212-216, and can perform some of the operations described above with regard to the web server 102, such as Step M (158). The state machine 212 can leverage state models 220 (similar to state models 116), the risk engine 214 can use guest data 222 (similar to guest data 114), and the request data analysis engine 216 can use the request data models 224 (similar to the request data models 118) to generate state scores, risk scores, and request scores, respectively. The malicious web traffic engine 218 can use deceptive response models 226 which can guide the type of deceptive response that is selected for a particular malicious request given any of a variety of factors, such as the individual and/or combined scores from the components 212-216, the sensitivity of the web content being requested, and/or other factors.

A plurality of web services A-N 208a-n are depicted and configured to each interface with the web security system 210 in order to assess potential malicious activity and to generate native deceptive responses. The web services 208a-n can be within a common network or domain, and can interface with multiple different client devices 202 through a network interface 206 and via the internet 204. When requests are received at the network interface 206, then can routed to corresponding web services 208a-n, which may in turn route the risk and deceptive response assessment to the web security system 210 in parallel to their preliminary processing of the request. Such processing of the request can be performed in parallel between the web services 208a-n (i.e., preliminarily processing request) and the web security system 210 (i.e., assessing potential malicious intent and deceptive response), which can permit for little to not delay in providing a response to the client device 202, even if a deceptive response is generated. Once completed, the web security system 210 may transmit a determination regarding whether the request from the client device 202 is malicious along with instructions for implementing a deceptive response, if warranted. The web services 208a-n can be programmed to natively within their own platforms generate native responses based on the deceptive response instructions from the web security system 210.

Figure 3:
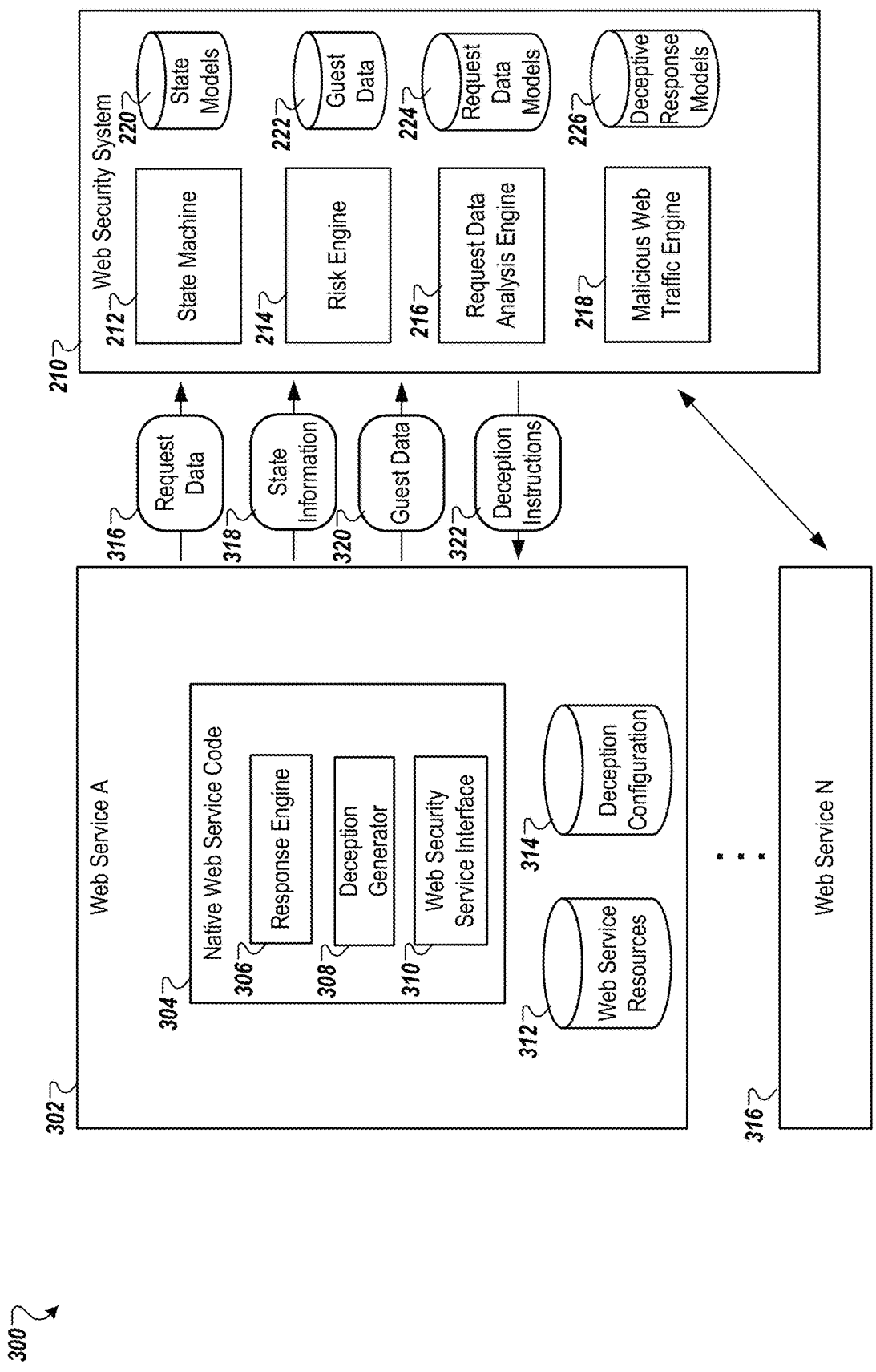
FIG. 3 is an example system for assessing the risk associated with client devices across a plurality web services.

FIG. 3 is an example system 300 for assessing the risk associated with client devices 202 across a plurality web services 302 and 316. The example system 300 and its components can be similar to the platform 100 and the system 200, as described above with regard to FIGS. 1-2.

The depicted system 300 provides a more detailed view of the components of the web service 302 that permit for providing native deceptive responses. Such components of the web service 302 can be implemented on other web services, such as the web service 316 and the web services 208a-n. The web service 302 includes native web service code 304, which can include a response engine 306 that is configured to receive client requests and to generate appropriate responses, a deception generator 308 that is configured to change the content generated by the response engine 306 and to generate alternate content in the event that deception instructions are received from the web security system 210, and a web security service interface 310 is configured to interface with the web security system 210 to transmit information for assessing risk and for receiving deception instructions. The web service 302 also includes web service resources 312, similar to the resources 112 described above with regard to FIG. 1. The web service 302 further includes deception configurations 314 that are specific to the web service 302 and the web service resources 312 that are being served by the service 302. The deception configuration 314 can, for example, map different types of deception instructions from the web security system 210, which may provide more generic instruction (not specific to web service 302), such as the level of risk and the level of deception being instructed. The deception configuration 314 can permit for a product and/or service owner of the web services 302 to customize the native deceptive response that is provided by the service 302 without having to understand the underlying operation of the web security system 210. Such a configuration can permit for the web security system 210 to be readily extensible and usable across a wide variety of web services, as well, which can improve overall website security.

The processing flow between the web service 302 can include the web service 302 transmitting request data 316, state information 318, and guest data 320 to the web security system 210 when a request is received. This can prompt the web security system 210 to perform the risk assessment described throughout this document, and to return deceptions instructions 322, which may instruct the service to provide a deceptive response and a type/category of response to provide. Various types of deceptive instructions 322 can be used. In one example, the deceptive instructions 322 can include data indicating that the associated guest account has an empty order history. This can deceptively indicate to the bad actor that the guest account has not been used for any legitimate purpose and thus is of low value to have stolen credentials for. In another example, when credentials for a genuinely unused account are maliciously used, the deceptive instructions 322 can instead deceptively indicate that this truly-low-value account has an extensive history of high-value purchases and/or high-value gift cards or other items of value. In this way, the malicious actor can be deceived into treating this low value account as though it was of particularly high value.

Figure 4:
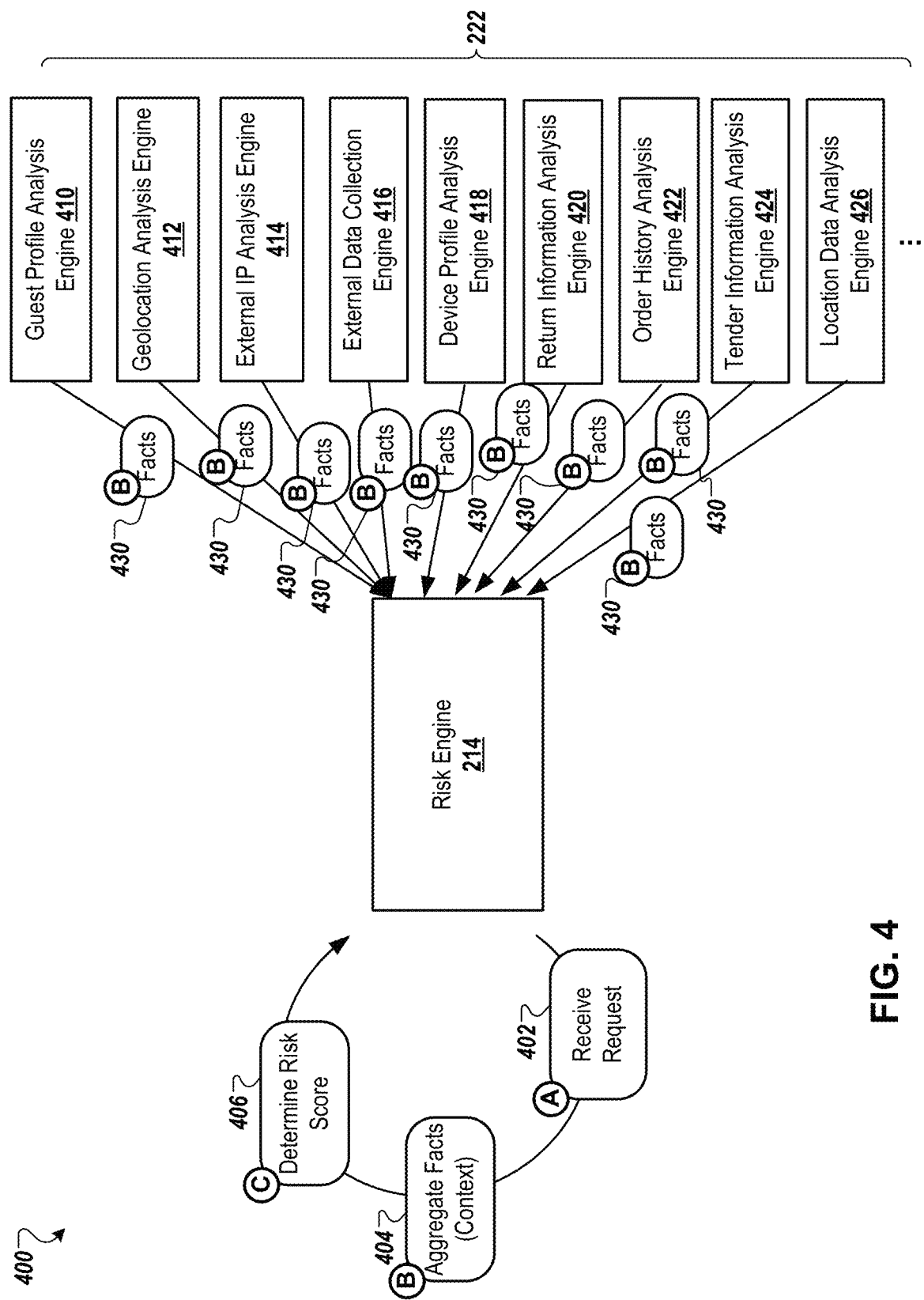
FIG. 4 is a block diagram of an example guest risk assessment system.

FIG. 4 is a block diagram of an example risk assessment system 400. The risk assessment system 400 can be similar to, and used to implement, the risk assessment system 106 in FIG. 1. The risk assessment system 400 includes a data aggregation and risk engine 214 ("Aggregator") configured to collect and aggregate input signals or data (e.g., facts, insights, etc.) from one or more sources 222 which analyze the guest and the context of the guest interaction with the website. In some implementations, the data aggregation and risk engine 214 is configured to collect facts relative to a guest of a website from multiple backend services, such as a guest profile analysis engine 410 ("User Profile Service"), a geolocation analysis engine 412 ("Geolocation Service"), an external IP analysis engine 414 ("External IP Service"), and an external data collection engine 416 ("Threat Intelligent"). Further, the data aggregation and risk engine 214 can provide a score for the guest at authentication time.

As illustrated in FIG. 4, the data aggregation and risk engine 214 receives a request from a remote computing device (Step A, 402). Such a request can include a request for a risk score for the guest vising the website. Alternatively or in addition, the request can include a request for contextual data for the guest of the website. The data aggregation and risk engine 214 can collect and aggregate facts (including insights and statistics) 430 from one or more sources 222, such as the guest profile analysis engine 410, the geolocation analysis engine 412, the external IP analysis engine 414, and the external data collection engine 416 (Step B, 404). The data aggregation and risk engine 214 can further generate a risk score for the guest (Step C, 406), which can be transmitted to, for example, the malicious web traffic engine 218.

In addition or alternatively, the sources 222 can include one or more of a device profile analysis engine 418, a return information analysis engine 420, an order history analysis engine 422, a tender information analysis engine 424, and a location data analysis engine 426.

The device profile analysis engine 418 operates to collect information of a user device that is used to access the website. The device information can include device identifiers, device tracking data (e.g., location history), and device utilization history (e.g., how the device has been used, authentication history, etc.). The device profile analysis engine 418 further operates to associate the device information with the user profile.

The return information analysis engine 420 operates to collect product return information, such as a product return history. For example, the product return information can include return statistics that can include different return types (e.g., walk-in returns, mail-in returns, commercial carrier returns, etc.). Different return types may be associated with different likelihoods of fraud and enforced thresholds.

The order history analysis engine 422 operates to collect order history and analyze order patterns based on the order history. Buying patterns may be associated with different risks of fraud. By way of example, a volume of order, and a type of items being purchased (e.g., highly resalable products) can be identified based on the order patterns and associated with different risks of fraud.

The tender information analysis engine 424 operates to collect tender methods such as types of payment. Different types of payment per same or different purchases can be associated with different risks of fraud. By way of example, if a single payment is made by a large number of gift cards or by a number of different credit cards, such a payment method can flag a potential risk of fraud.

The location data analysis engine 426 operates to collect information of various locations associated with product purchase or shipment, such as where an item is shipped, which store is visited to purchase or pick up an item, etc. Such locations of product purchase or shipping can be associated with different likelihoods of fraud.

The sources 222 are not limited to those described herein and can include other suitable sources. Further, the sources 222 are configurable depending on management purposes and/or the attributes of website being monitored.

As described above, the risk assessment system 200 and risk scores can be determined, for example, using the technology described in U.S. Ser. No. 17/118,444, which was filed on Dec. 10, 2020, is entitled WEBSITE GUEST RISK ASSESSMENT AND MITIGATION, and published as U.S. Pub. No. 2021/0185076, the entire contents of which are hereby incorporated by reference.

Figure 5:
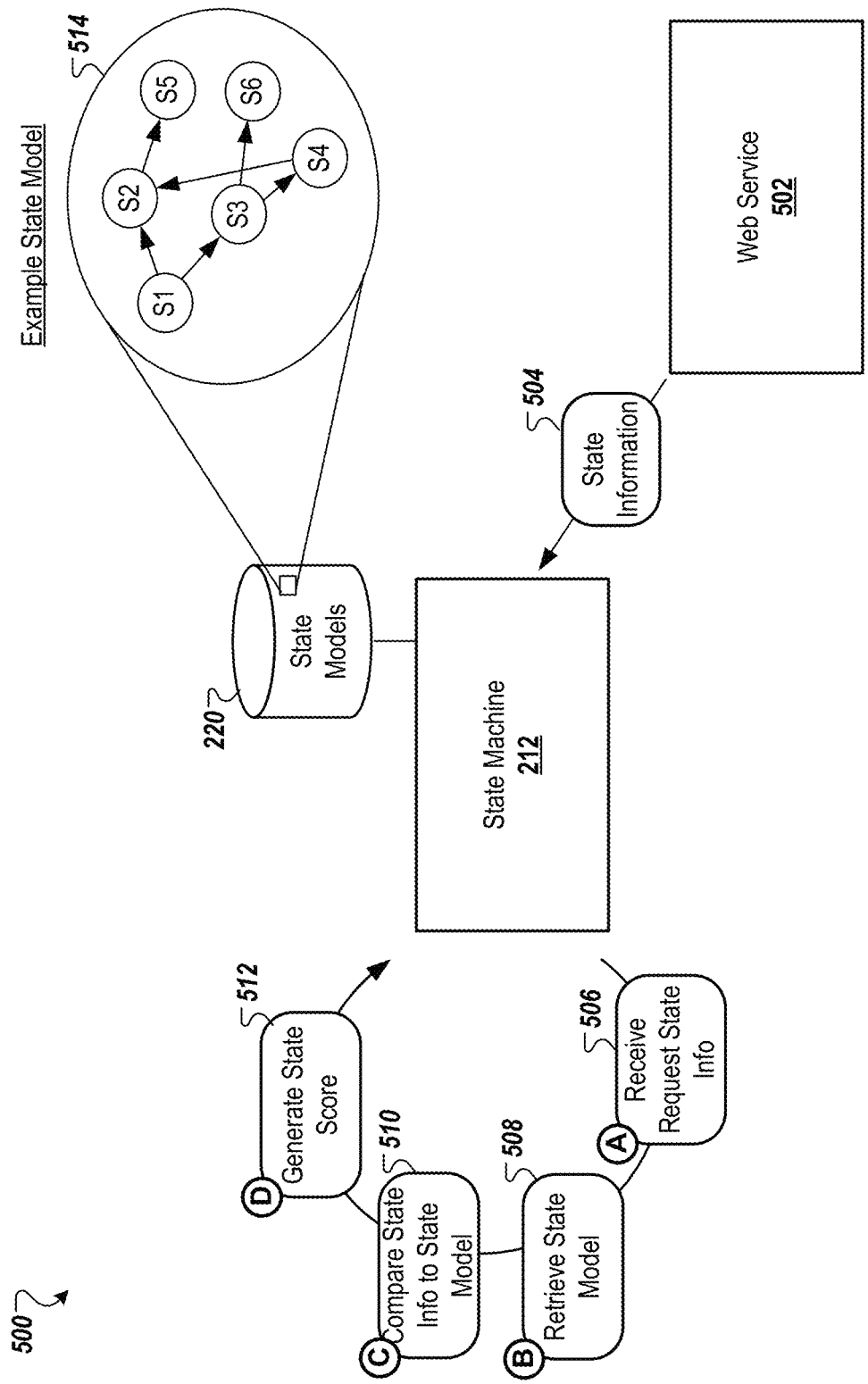
FIG. 5 is a block diagram of an example state assessment system.

FIG. 5 is a block diagram of an example state assessment system 500. The state assessment system 500 can be similar to, and used to implement, the state assessment system 108 in FIG. 1. State information 504 can be received by the state machine 212 (Step A, 506), which can prompt the state machine to retrieve a corresponding state model for the request that was received by the web service 502 (Step B, 508). An example state model 514 is depicted for illustrative purposes, showing state transitions across different states S1-S6 that are modeled for the web service 502. For example, typical and/or required state transitions for a benign user of the web service 502 would involve transitioning from state S1, to S3, and then to S6. However, a state transition from S1 to S6 is not included in the model, and such a transition that is outside the bounds of the state model 514 may indicate malicious behavior by the client device. Accordingly, the state machine 212 can compare the state model (e.g., model 514) to the state info (Step C, 510), which can include the current state as well as chain of state transitions performed by the client device before transmitting the request. A state score can be generated based on the comparison (Step D, 512).

Figure 6:
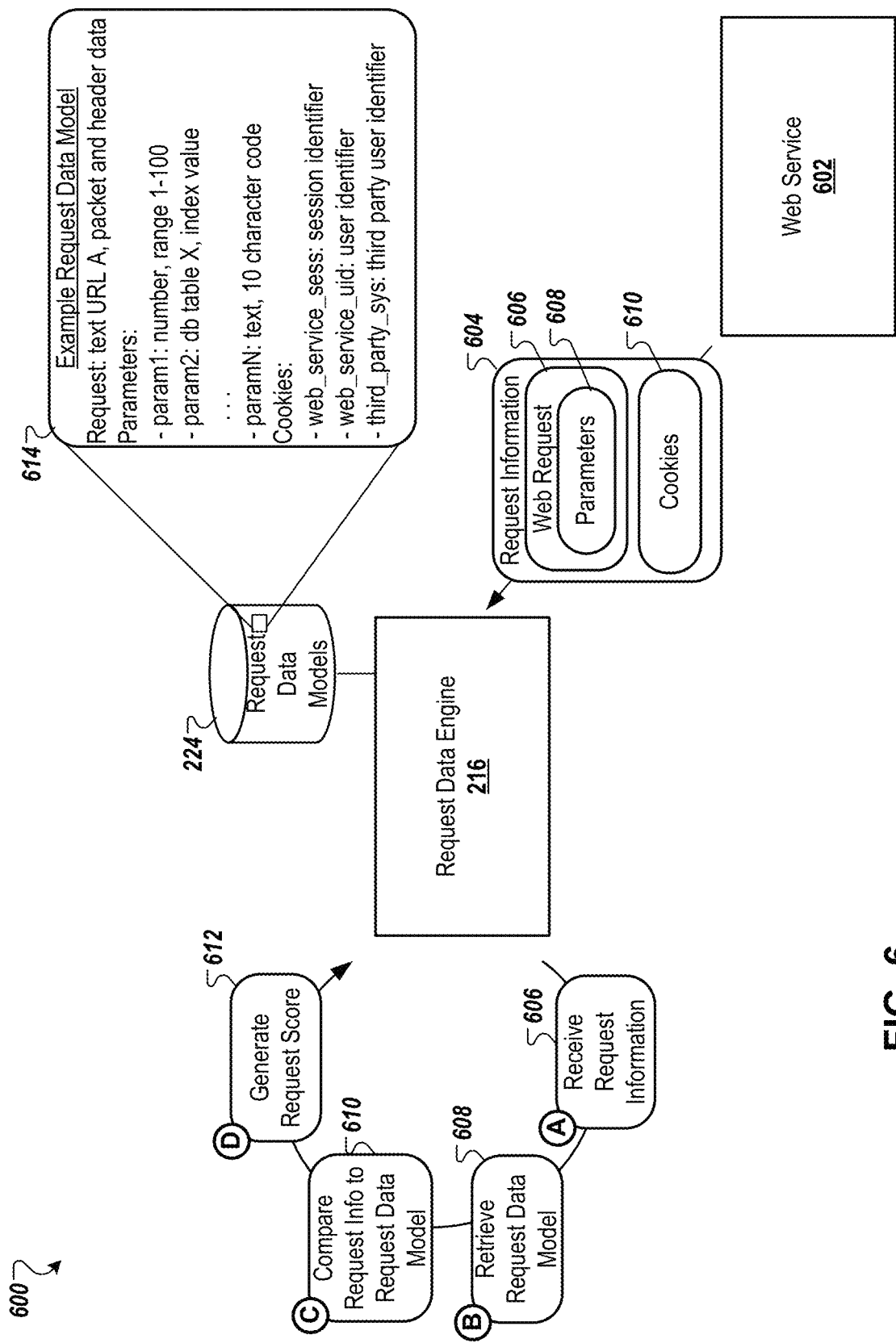
FIG. 6 is a block diagram of an example request data assessment system.

FIG. 6 is a block diagram of an example request data assessment system 600. The state assessment system 600 can be similar to, and used to implement, the request data assessment system 110 in FIG. 1. Request information 604 can be received by the request data engine 216 (Step A, 606), which can prompt the state machine to retrieve a corresponding request data model for the request that was received by the web service 602 (Step B, 608). The request information 604 an include, for example, the web request 606 (e.g., URL) as well as the parameters 608 (e.g., parameters appended to URL), and can include cookies 610. Additional and/or alternate information can also be included in the request information 604. An example request data model 614 is depicted for illustrative purposes, showing example range of values and data for the request, parameters, and cookies that are being provide, such as the type of data being transmitted (e.g., number, text), the length of data elements (e.g., 10 characters), reference points for data elements (e.g., element is can be verified/referenced via database), cookie names and content, and/or other details. Values that are received in the request information 604 that fall outside of the model and/or that are missing portions of the model 614 can indicate potentially malicious behavior by the client computing device. Accordingly, the request data engine 216 can compare the request data model (e.g., model 614) to the request information 604 info (Step C, 610). A request score can be generated based on the comparison (Step D, 612).

Figure 7:
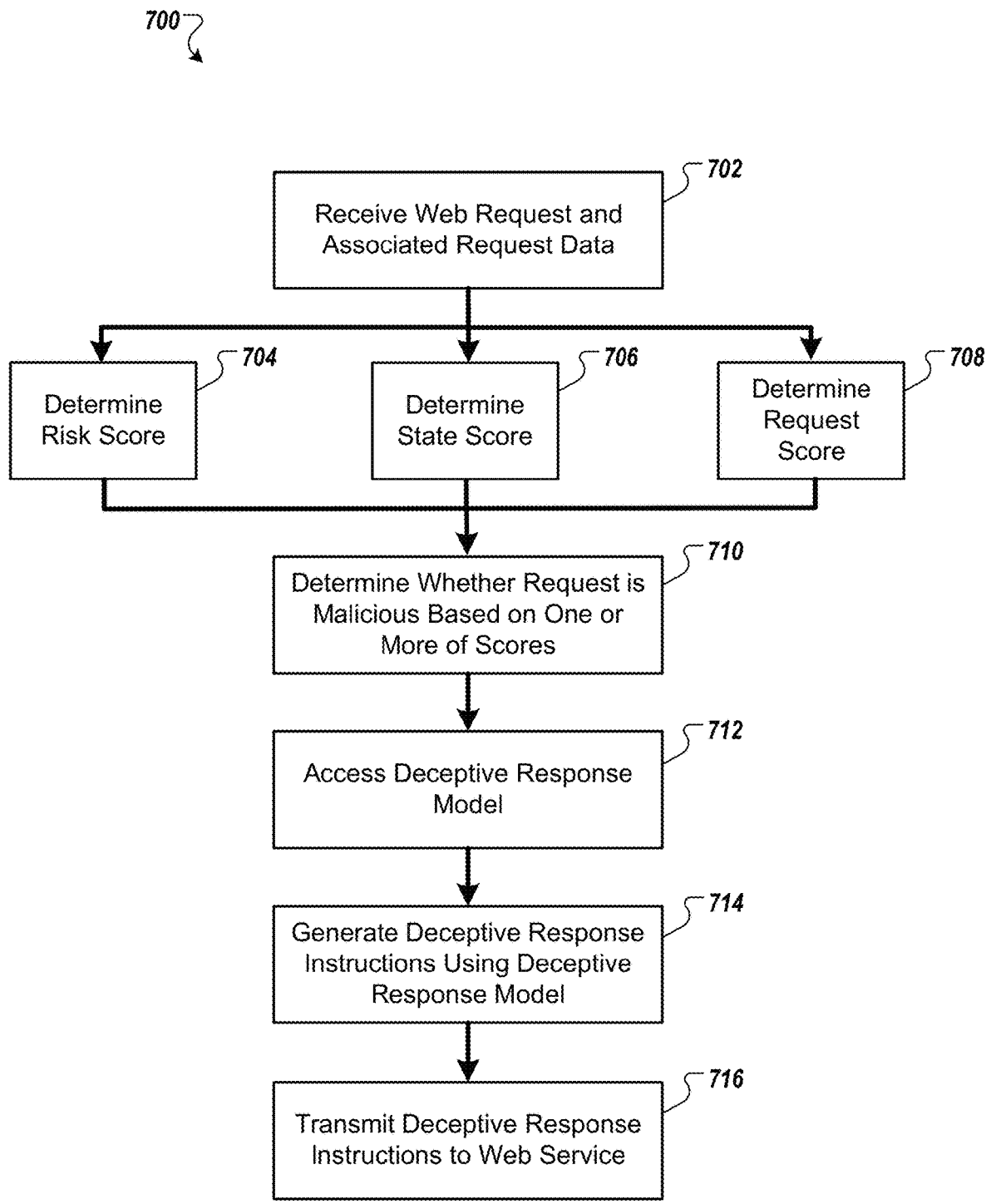
FIG. 7 is a flowchart of an example process for assessing the potential security risk of a web request from a client device and providing deceptive responses.

FIG. 7 is a flowchart of an example process 700 for assessing the potential security risk of a web request from a client device and providing deceptive responses. The process 700 can be performed by any of a variety of devices and systems, such as the systems 100-600 described above with regard to FIGS. 1-6.

A web request an be received along with associated data for the request (702). The request data and other associated data (i.e., guest data, state data) can be provided to corresponding systems and engines to determine a risk score (704), to determine a state score (706), and/or to determine a request score (708). As discussed above, one, two, or all of these determinations can be made, and they may be made in parallel or in a staggered fashion. A determination regarding whether the request is malicious can be made based on one or more of the risk score, the state score, and the request score (710). The determination can be performed using any of a variety of techniques, such as those described above with regard to Step M (158) in FIG. 1. In response to determining that the request is malicious, a deceptive response model (e.g., deceptive response model 226) can be accessed (712) and can be used to generate deceptive response instructions for the web service (714). The deceptive response instructions can be transmitted to the web service (716), which can implement the deceptive response instructions to provide a native deceptive response from within the web service platform.

Figure 8:
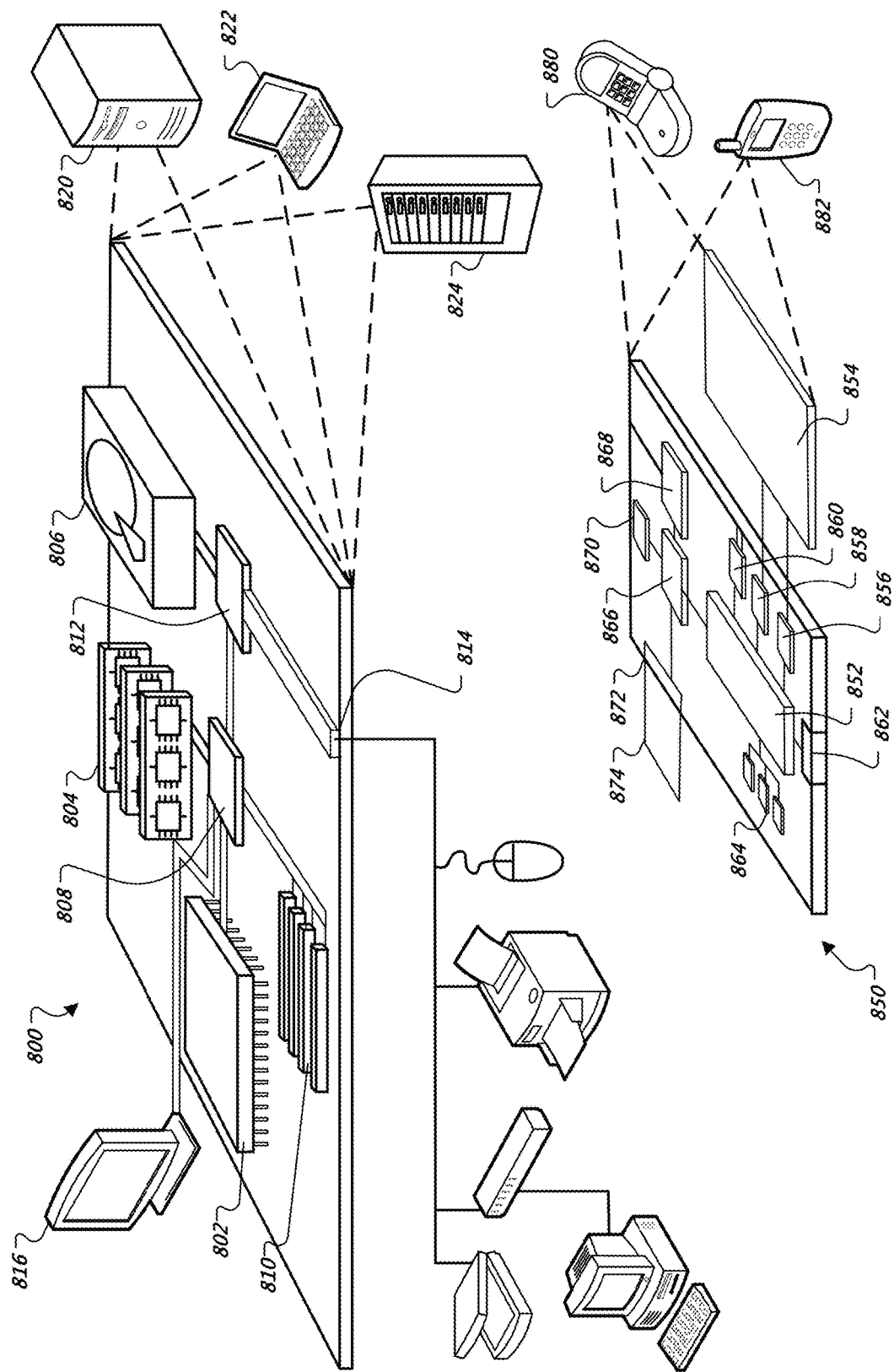
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provided, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for detecting malicious website attacks and providing native deceptive responses to website attackers, the system comprising:
   a web server system hosting a website, the website server system including one or more processors and computer-readable memory and being configured to:
      receive, from a client computing device, a request for web content on the website,
      generate, in response to the request, a response containing the web content, and
      transmit, to the client computing device, the response with different content from the web content that has been requested; and
   a web security system in communication with the web server system, the web security system being configured to:
      receive the request and associated data related to the request,
      determine, based on the request and the associated data, a risk score for the client computing device, wherein the risk score indicates a probability that the client computing device is a malicious attacker,
      determine, based on the request and the associated data, a state score for the client computing device's browsing session with the web server system, wherein the state score indicates a probability that the request is malicious in nature based on a state of the request,
      determine, based on the request and the associated data, a data request score for the request, wherein the data request score indicates a likelihood that the request is malicious based on the content of the request,
      determine, based on one or more of the risk score, the state score, and the data request score, that the request has at least a threshold likelihood of being malicious,
      transmit, to the web server system and in response to determining that the request has at least the threshold likelihood of being malicious, deceptive response instructions instructing to provide a native deceptive response from the web server system;
   wherein the web server system is further configured to:

receive, from the web security system, the deceptive response instructions, modify, in response to receiving the deceptive response instructions, the response to contain the different content from web content that has been requested, wherein the response containing the different content from the web content that has been requested comprises the native deceptive response generated by the web server system, and wherein the modification to the response comprises modifying, by the web server system, a portion of underlying code of the website to generate the native deceptive response to include the different content, and wherein the transmitting, to the client computing device, the response with the different content from the web content that has been requested comprises transmitting the native deceptive response containing the different content, and wherein the web server system and the web security system are configured to perform their respective recited operations in parallel to generate the native deceptive response with less than a threshold amount of delay relative to non-deceptive native responses to avoid detection as deceptive by the client computing device.

2. The system of claim 1, wherein the determination of whether the request has at least the threshold likelihood of being malicious is based on at least two of the risk score, the state score, and the data request score.

3. The system of claim 1, wherein the determination of whether the request has at least the threshold likelihood of being malicious is based on the risk score, the state score, and the data request score.

4. The system of claim 1, wherein the risk score is further determined based on analysis of factual and contextual content related to the client computing device.

5. The system of claim 1, wherein the state score is further determined based on a comparison of the state of the request relative to one or more state models for the website.

6. The system of claim 5, wherein the one or more state models include graphs of permitted state transitions within the website.

7. The system of claim 1, wherein the data request score is further determined based on a comparison of the content of the request to one or more data request models for the website.

8. The system of claim 7, wherein the data request models include permitted URL parameters and cookies for the website.

9. The system of claim 1, wherein the risk score, the data request score, and the state score are determined in parallel by the web security system.

10. A method for detecting malicious website attacks and providing native deceptive responses to website attackers, the method comprising:

receiving, from a client computing device, a request for web content on the website at a web server system, generating, in response to the request, a response containing the web content, transmitting, to the client computing device from the web server system, the response with different content from the web content that has been requested;

receiving associated data related to the request, determining, based on the request and the associated data, a risk score for the client computing device, wherein the risk score indicates a probability that the client computing device is a malicious attacker, determining, based on the request and the associated data, a state score for the client computing device's browsing session with the web server system, wherein the state score indicates a probability that the request is malicious in nature based on a state of the request, determining, based on the request and the associated data, a data request score for the request, wherein the data request score indicates a likelihood that the request is malicious based on the content of the request, determining, based on one or more of the risk score, the state score, and the data request score, whether the request has at least threshold likelihood of being malicious, transmitting, in response to determining that the request has at least a threshold likelihood of being malicious, deceptive response instructions instructing to provide a native deceptive response from the web server system;

receiving the deceptive response instructions, modifying, in response to receiving the deceptive response instructions, the response to contain the different content from the web content that has been requested, wherein the response containing the different content from the web content that has been requested comprises the native deceptive response generated by the web server system, and wherein the modification to the response comprises modifying, by the web server system, a portion of underlying code of the website to generate the native deceptive response to include the different content, and wherein the transmitting, to the client computing device from the web server system, the response with the different content from the web content that has been requested comprises transmitting the native deceptive response containing the different content, and wherein the web server system and the web security system are configured to perform their respective recited operations in parallel to generate the native deceptive response with less than a threshold amount of delay relative to non-deceptive native responses to avoid detection as deceptive by the client computing device.

11. The method of claim 10, wherein the determination of whether the request has at least the threshold likelihood of being malicious is based on at least two of the risk score, the state score, and the data request score.

12. The method of claim 10, wherein the determination of whether the request has at least the threshold likelihood of being malicious is based on the risk score, the state score, and the data request score.

13. The method of claim 10, wherein the risk score is further determined based on analysis of factual and contextual content related to the client computing device.

14. The method of claim 10, wherein the state score is further determined based on a comparison of the state of the request relative to one or more state models for the website.

15. The method of claim 10, wherein the data request score is further determined based on a comparison of the content of the request to one or more data request models for the website.

16. The method of claim 10, wherein the risk score, the data request score, and the state score are determined in parallel by the web security system.

17. A method for detecting malicious website attacks and providing native deceptive responses to website attackers, the method comprising:

receiving, from a client computing device, a request for web content on the website at a web server system, generating, in response to the request, a response containing the web content, and receiving associated data related to the request, determining, based on the request and the associated data, a risk score for the client computing device, wherein the risk score indicates a probability that the client computing device is a malicious attacker, determining, based on one or more of a risk score, a state score, and a data request score, whether the request has at least threshold likelihood of being malicious, transmitting, in response to determining that the request has at least a threshold likelihood of being malicious, deceptive response instructions instructing to provide a native deceptive response from the web server system;

receiving the deceptive response instructions, modifying, in response to receiving the deceptive response instructions instructing to provide the native deceptive response, the response to contain the different content from the web content that has been requested, wherein the response containing the different content from web content that has been requested comprises the native deceptive response generated by the web server system, and wherein the modification to the response comprises modifying, by the web server system, a portion of underlying code of the website to generate the native deceptive response to include the different content that locks out the client computing device from the website, and transmitting, to the client computing device from the web server system, the response comprising the native deceptive response that locks out the client computing device from the website, and wherein the web server system and the web security system are configured to perform their respective recited operations in parallel to generate the native deceptive response with less than a threshold amount of delay relative to non-deceptive native responses to avoid detection as deceptive by the client computing device.

* * * * *